United States Patent [19]
Thome

[11] 3,850,796
[45] Nov. 26, 1974

[54] LEAKPROOF CONNECTION MEANS BETWEEN HOOP AND NOZZLE OF PRESSURE VESSEL

[75] Inventor: Paul Thome, Saint-Cloud, France

[73] Assignee: Babcock-Atlantique, SA, Paris, France

[22] Filed: May 10, 1972

[21] Appl. No.: 252,050

[52] U.S. Cl. .................................. 176/50, 176/87
[51] Int. Cl. .................................... G21c 15/00
[58] Field of Search .............. 176/54, 61, 87, 85, 50

[56] References Cited
UNITED STATES PATENTS

| | | | |
|---|---|---|---|
| 2,990,349 | 6/1961 | Roman | 176/54 X |
| 3,212,978 | 10/1965 | Short et al. | 176/50 X |
| 3,260,650 | 7/1966 | Kalk et al. | 176/85 X |
| 3,366,546 | 1/1968 | Anthony et al. | 176/61 X |
| 3,385,760 | 5/1968 | Hawkins | 176/61 X |
| 3,398,050 | 8/1968 | Yevick et al. | 176/61 X |
| 3,486,973 | 12/1969 | Georges et al. | 176/61 X |

Primary Examiner—Reuben Epstein
Attorney, Agent, or Firm—J. M. Maguire

[57] ABSTRACT

Illustrative embodiments of the invention are directed to the structure within a pressure vessel for a nuclear reactor. Sealing rings are placed against the seats of the pressure vessel discharge nozzles. These rings are field-fastened to the structure through distortionless electron beam welding. These seals are flexible and do not apply uncontrollable stresses to the pressure vessel while establishing a leak-tight condition between the inlet and outlet coolant flow at any anticipated reactor temperature. This invention eliminates the usual core barrel and pressure vessel machining operations and, additionally, insures the necessary leak-tight joints at working temperatures.

4 Claims, 3 Drawing Figures

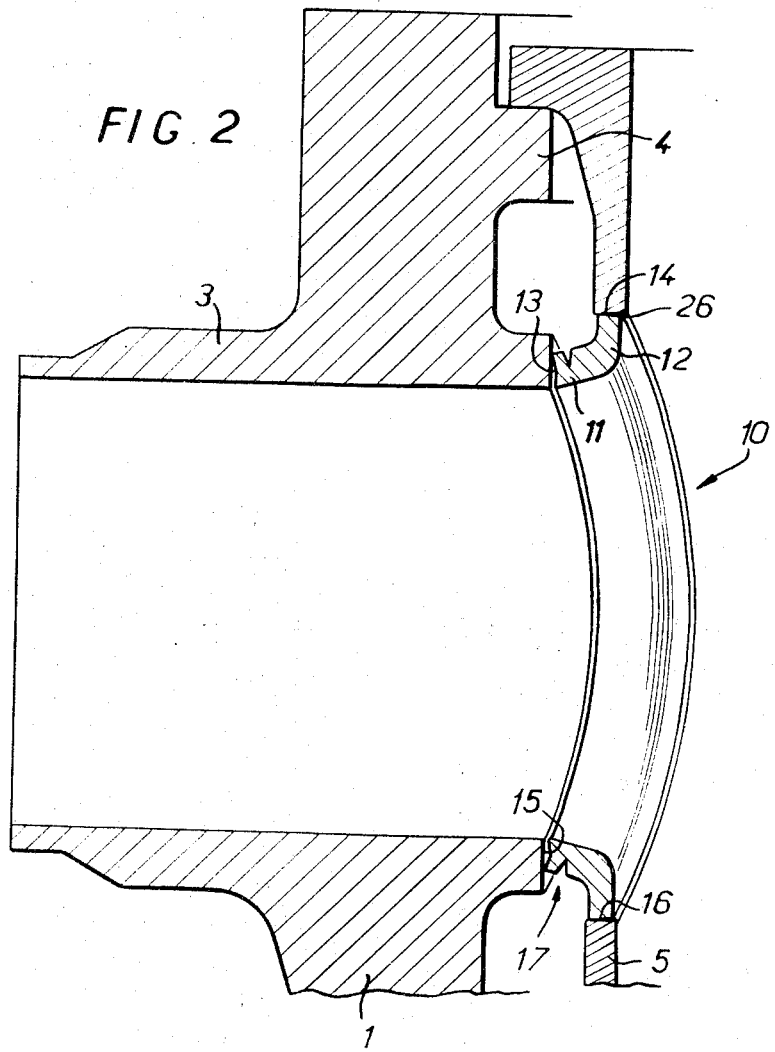
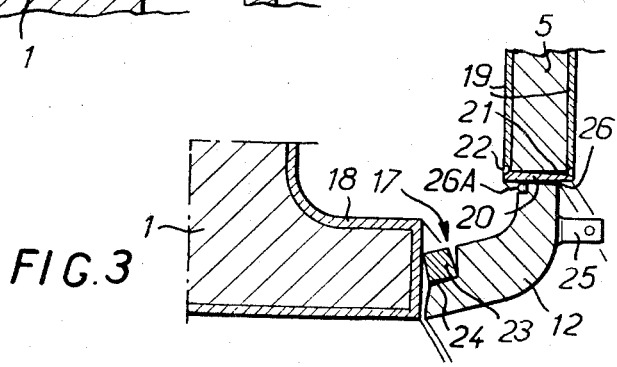

LEAKPROOF CONNECTION MEANS BETWEEN HOOP AND NOZZLE OF PRESSURE VESSEL

BACKGROUND OF THE INVENTION

Field of the Invention

The present invention relates to nuclear reactor systems and, more particularly to improvements in the hydraulic characteristics of reactor pressure vessels, and the like.

BRIEF DESCRIPTION OF THE DRAWING

FIG. 2 is an enlarged view of a portion of nuclear reactor pressure vessel embodying principles of the invention; and FIG. 3 is a further enlargement of a part of a pressure vessel portion.

DETAILED DESCRIPTION OF THE PREFERRED EMBODIMENTS

Figure 1:
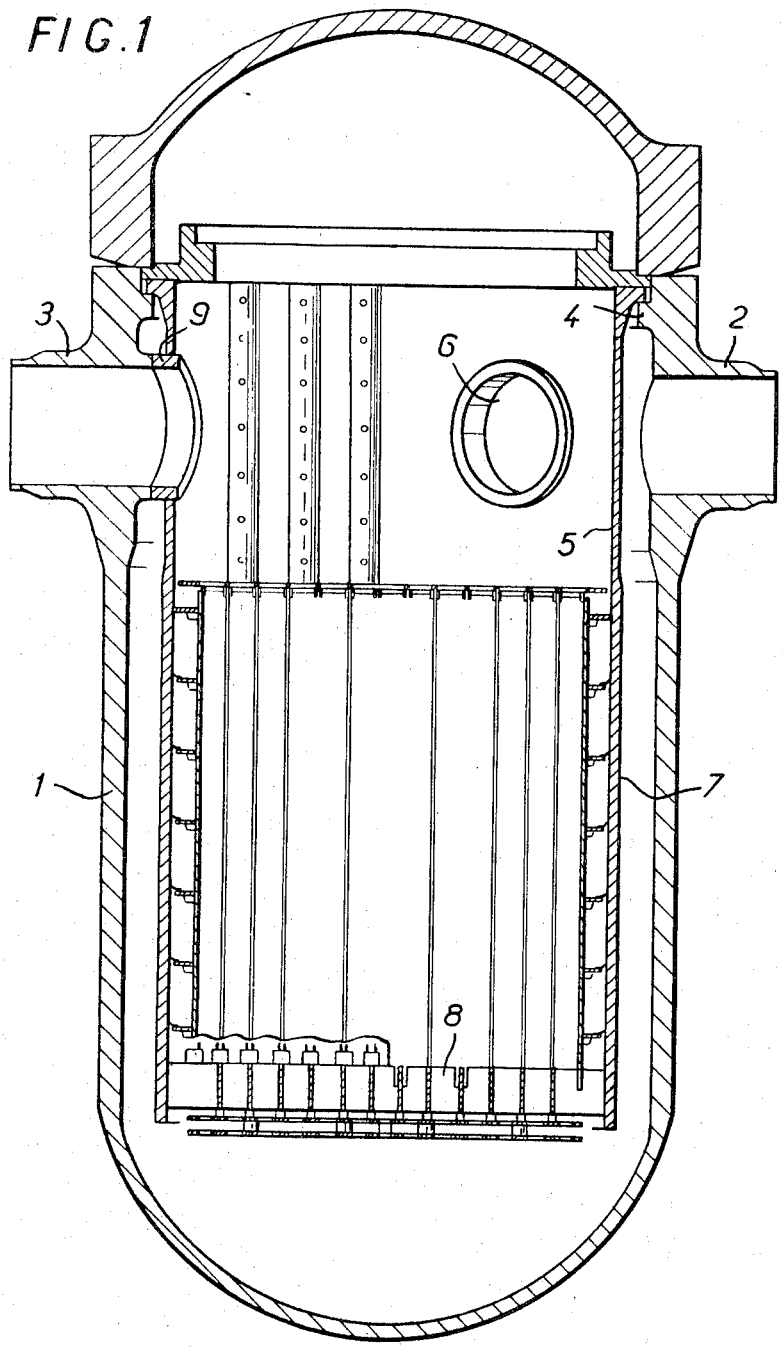
FIG. 1 shows an illustrative nuclear reactor pressure vessel in full section.

In FIG. 1 a nuclear reactor pressure vessel 1 has a longitudinally disposed cylindrical envelope which is closed at the ends by a convex base and a domed roof. Reactor coolant inlet and outlet nozzles 2 and 3 respectively, protrude from the pressure vessel 1 near the domed roof. These nozzles are all disposed in the same plane that is transverse to the longitudinal axis of the cylindrical vessel and are separated from each other, moreover, through an angular distribution. An annular flange 4 is formed on the inner surface of the vessel 1. This flange serves as a means for supporting a distribution hoop 5. The hoop 5 has openings 6 for reactor coolant distribution. The openings 6 are aligned with the nozzles 3 in the vessel 1.

The distribution hoop 5 is extended by means of a massive skirt 7. This skirt serves as a thermal shield and as an hydraulic guide. The skirt 7 also supports the fuel elements in the reactor core (not shown), because the skirt bears the loads that are received from a lower grid 8 on which these fuel elements rest.

In operation, a coolant, in forced circulation in a primary coolant loop, enters the pressure vessel 1 through the nozzles 2, and flows through the annular duct that is formed between the inner surface of the vessel and the skirt 7. The coolant then rises through the core of the reactor and reaches the distribution hoop 5, whereupon the coolant is discharged from the vessel 1 in order to complete one cycle through the loop.

To insure proper forced circulation, it is imperative that direct communication inside the vessel 1 be prevented between the incoming coolant and the discharging coolant. Toward this end, and in accordance with the invention, a leak-proof contact is established between the hoop 5 and the pressure vessel 1 at the common surfaces of the output nozzles 3 and the respective opening 6. Furthermore, the structures within the pressure vessel 1 must be dismountable, must resist corrosion, and must be rigid in order to withstand vibration stresses. In order to establish a satisfactory leak-proof seal, moreover, consideration should be given to the nature of the materials used, and the attendant differences in thermal expansion which can occur between the internal reactor structures and the pressure vessel.

Usually, to satisfy these requirements a corrosion-proof material, of which stainless steel is typical, is selected for the hoop 5. This material has a coefficient of thermal expansion that is greater than the coefficient of the steel from which the pressure vessel is made. The interiors of the openings 6 are lined with solid annular pieces 9 and the corresponding interior terminal faces of the nozzles 3 are carefully machined to establish a tolerance or clearance that will allow the hoop to be positioned within the pressure vessel through a vertical movement. The machined surfaces, moreover, are designed to expand at the operating temperature of the installation and establish the required leakproof seals between the hoops 5 and the pressure vessel 1 at the coolant outlet nozzles 3.

This prior art solution has many drawbacks. For example, it requires tedious and expensive machining operations that must be executed on large pieces, e.g., the pressure vessel and the hoop 5. It requires a fabrication clearance, moreover, that is determined in accordance with thermal expansion criteria, rather than as a strict function of the assembly requirements. It also forbids the use of a single material for the hoop and the vessel, because the leakproof condition is attended only at a temperature that is equal or superior to the design operating temperature. This need for different thermal expansion properties leads to a further difficulty in that these differences generate radially directed bursting forces, which are especially troublesome inasmuch as they are localized at the coolant discharge nozzles 3.

In accordance with the present invention, a distribution hoop fabrication and assembly technique is provided to eliminate costly machining, remove the thermal expansion determination of the hoop clearance allow a wider selection of materials for the structures within the pressure vessel, establish a satisfactory leakproof seal in all reactor operating conditions and alleviate the bursting stresses at the pressure vessel discharge nozzles. More specifically, the distribution hoop 5 is positioned within the pressure vessel. The sleeve openings 6 for the pressure vessel outlet nozzles 3 are aligned in proper position relative to the inner nozzle surfaces. The sleeves are welded to the hoop by means of a circular sweep with an electron beam welding apparatus along the contact surface that is formed between the sleeves and the associated edges of the respective sleeve openings.

This technique facilitates distribution hoop installation within the pressure vessel in view of the increased clearance that results from the temporary absence of connection pieces. The clearance or tolerance requirement, moreover, can be provided in situ with precision, because it involves only an adjustment to the positions of relatively light sleeves. Further in this connection, structural assembly through electron beam welding does not alter the clearance that is established by means of the position adjustment.

In some instances, particularly in those cases in which only one structural material is used in the hoop and the pressure vessel 1, the initial clearance can be reduced to zero. In these circumstances the outer terminal surface of the sleeve can be placed in contact with the inner surface of the corresponding outlet nozzle before the sleeve is electron beam welded to the hoop.

According to another method of embodiment of the invention, the sleeve is compressed and elastically deformed against the corresponding surface of the outlet nozzle. This compression and deformation produces a prestressed contact between the sleeve and the nozzle, before the sleeve is welded to the hoop.

The invention leads, therefore, in some situations to the use of a sleeve that is elastically deformable in an axial direction.

The invention also enables an ordinary steel to be used in the hoop 5. The steel from which the hoop is formed has the same coefficient of thermal expansion as the pressure vessel 1. The hoop also is protected on two surfaces by means of an anti-corrosion metal plating. It is particularly advantageous, in this case, to protect the respective edges of the hoop outlet openings by means of individual rings of anti-corrosion metal. Preferably, these rings each have an axial dimension that is at least equal to the combined thickness of the base metal and the layers of plating on the wall of the hoop in order to enable the ring to be welded to the base metal by electron beam technique, and then to weld the ring to each of the plated layers by means of an anti-corrosion added-metal electrode. The connecting sleeve, moreover, is assembled on the inner cylindrical surface of the protective ring.

According to another embodiment of the invention, the axial elastic deformability of the individual sleeve is enhanced by means of a radially disposed V-shaped groove that is formed on one of the sleeve surfaces. The groove is spaced from the surface that is in contact with the pressure vessel outlet nozzle. The part of the sleeve that is defined between the groove and the outlet nozzle contact surface is complemented with an added ring that is joined to the sleeve through an electron beam weld.

As shown in FIG. 2, the outlet nozzle 3 for the vessel 1 is in alignment with the opening 6 in the distribution hoop 5. A sleeve 10 joins the hoop 5 to the nozzle 3. The inner diameter of the hoop opening 6 is significantly greater than the passageway in the nozzle 3, in order to avoid losing a portion of the flow area at the location of the connecting element or sleeve 10. The embodiment of the invention that is shown in FIG. 1 is illustrative of a solid sleeve that is equal in thickness to the difference between the radii of the hoop opening 6 and the passageway in the respective outlet nozzle 3. The sleeve 10 is a relatively light annular piece that has an elbowed profile with two arms 11 and 12. The arm 11 is oriented axially or approximately axially, and terminates in a surface 13 that is adapted to engage the inner terminal face of the discharge nozzle 3. The arm 12 is turned outward in a radial direction. The arm 12, moreover, terminates in a surface 14 that is in contact with a circular edge 16 of the hoop opening 6 to provide a plane for an electron beam weld. The surfaces 16 and 14 form, together, an interface of constant thickness in which an electron beam weld is subsequently to be established to join the sleeve 10 and the hoop 5. The surface 13, however, is concave. In this instance only the outer circular border of the sleeve 10 engages the flat terminal face 15 of the nozzle 3.

More specifically, the sleeve 10 has, on its outer lateral face a V-shaped groove 17 that penetrates to about one-half thickness of the sleeve. The groove 17 also is situated a distance from the surface 13. This spaced groove 17 imparts to the sleeve 10 a capacity for elastic deformation, which may be reflected in the total or partial closing of the groove 17, under the influence of an axial compression force that is applied to the outer border of the surface 13.

In order to assemble the structure, the hoop 5 is installed within the pressure vessel without the sleeves 10. The hoop openings 6 are aligned with the discharge nozzles 3. The sleeve 10 is positioned within the opening 6, and is adjusted more exactly with respect to the nozzle 3. In accordance with the invention this final adjustment in position includes establishing a given clearance between the surfaces 13 and 15, or in appropriate circumstances insuring a contact between these surfaces that is established through a prestressed elastic deformation of the sleeve 10. As soon as the final adjustment is complete, the sleeve 10 is attached to the hoop 5 with the aid of a spot-weld, or through any convenient means, and then sweeping interface between the surfaces 14 and 16 with an electron beam welder.

If an initial clearance is provided between the surfaces 13 and 15, the pressure vessel surface 15 cannot operate beyond a particular operating temperature because of the differential expansion of the pressure vessel 1 and the discharge nozzle 3. If this temperature is exceeded, the resulting elastic deformation of the relatively thin sleeve 10 will generate only weak forces that are directed outward in a radial direction toward the pressure vessel 1.

The absence of an initial clearance between the surfaces 13 and 15 is acceptable if little or no difference exists in the coefficients of expansion for the materials in the pressure vessel 1 and the hoop 5. In this instance, the elastic deformation of the sleeve 10, established through an initial prestressing, before the installation is brought up to temperature, will serve to insure an effective contact force between the surface 13 and 15.

The embodiment of the invention that is shown in FIG. 3 is directed to an installation in which the pressure vessel 1 and the hoop 5 have essentially the same coefficient of thermal expansion. The pressure vessel 1 is formed of structural steel and is protected on its inner surface through an anti-corrosion plating 18. The distribution hoop 5, formed from a steel that is of the same grade as the vessel 1, also bears on the inner and outer cylindrical surfaces two layers of anti-corrosion plating 19. The edge of the hoop opening 6 also is lined with a ring 20 of anti-corrosion metal which is bevelled along its two circular borders to form two grooves with respect to the adjacent borders of the anti-corrosion plating layers 19.

In the course of assembly, the ring 20 is in contact only with the base metal, the presence of the bevels having the effect of forming two grooves between the ring and the respective layers 19. An electron beam weld 21 that connects the ring 20 to the basic steel structure of the hoop 5 is complemented by depositing a welded bead 22 of anti-corrosion metal in each of the grooves. In this way materials that are vulnerable to corrosion are avoided on the surface of the hoop 5 these materials ordinarily form through a fusing of the base steel which tends to rise along the interface that is swept by the electron beam when the weld 21 is being made.

In FIG. 3, the part of the sleeve that is defined between the surface 13 and the V-shaped groove 17, comprises an additional ring 23 that is connected to the rest of the sleeve through an electron beam weld 24. The choice of an appropriate metal for this added ring, such as INCONEL, makes it possible to improve the elastic properties of the sleeve 10 as a whole.

The sleeve 10, as shown in the embodiment of the invention that is characterized in FIG. 3, is equipped with pins 25, which form alignment elements for assembly or welding. On the outer lateral face of the sleeve 10 a circumferential groove is adapted to received a sealing ring 26A in order to plug the interface with the electron beam weld 26 and insure that the corresponding welding aparatus will be kept in a vacuum.

The principles of the invention are applicable to devices other than nuclear reactors. The invention, for example, can find applications in the assembly and internal structures in reactors that are designed for the petrochemical industry, and the like.

What is claimed is:

1. A reactor system for operation at elevated temperature comprising a pressure vessel having inlet and discharge nozzles, a distribution hoop within said pressure vessel having a fluid passage opening in alignment with a respective one of said inlet and discharge nozzles, sleeve means interposed between said hoop opening and said respective nozzle to establish a leakproof connection between said hoop and said nozzle, said sleeve having a groove in the surface thereof to accommodate stresses that are developed between said hoop and said pressure vessel, wherein said hoop further comprises a hollow metal cylinder, two layers of anti-corrosion metal each on respective inner and outer hoop surfaces, a ring of metal within said hoop fluid passage opening, and a bead of anti-corrosion weld metal joining said ring to said anti-corrosion metal layers on said hoop.

2. A system according to claim 1 wherein said sleeve means further comprises a pair of arms, one of said arms being disposed toward said hoop and another of said arms being disposed toward said nozzle, said arms terminating in transversely disposed annular hoop and nozzle contact surfaces, and electron beam welds joining said annular surfaces to said respective hoop and nozzle.

3. A system according to claim 2 wherein said sleeve further comprises a metal structure that is relatively thinner than said hoop and said nozzle.

4. A system according to claim 2 wherein one of said arms further comprises another ring, said ring being disposed on the end of said one arm adjacent to and in contact with said nozzle, said ring and said arm forming said groove, said groove being spaced from said nozzle.

* * * * *